US012645803B2

(12) United States Patent
Zawadowskiy et al.

(10) Patent No.: US 12,645,803 B2
(45) Date of Patent: Jun. 2, 2026

(54) GENERATING TELEMETRY BASED ON DATA PROCESSING UNITS PERFORMING REAL-TIME ANALYSIS CLOSE TO DATA SOURCE

(71) Applicant: Cisco Technology, Inc., San Jose, CA (US)

(72) Inventors: Andrew Zawadowskiy, Hollis, NH (US); Oleg Bessonov, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 18/610,356

(22) Filed: Mar. 20, 2024

(65) Prior Publication Data

US 2025/0298901 A1    Sep. 25, 2025

(51) Int. Cl.
*G06F 21/57*    (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 9,953,158 | B1 * | 4/2018 | Benameur | G06F 21/572 |
| 10,623,426 | B1 * | 4/2020 | Yumer | H04L 63/1425 |
| 11,157,620 | B2 * | 10/2021 | Fang | G06F 21/577 |
| 11,397,808 | B1 * | 7/2022 | Prabhu | G06F 21/566 |
| 2012/0240231 | A1 * | 9/2012 | Sohn | G06F 21/564 726/24 |
| 2016/0373476 | A1 * | 12/2016 | Dell'Anno | G06F 21/552 |
| 2017/0078324 | A1 * | 3/2017 | Bordawekar | H04L 63/1458 |
| 2017/0223046 | A1 | 8/2017 | Singh | |
| 2017/0230389 | A1 | 8/2017 | Cochenour | |
| 2019/0114420 | A1 * | 4/2019 | Chistyakov | G06F 21/564 |
| 2019/0319977 | A1 | 10/2019 | Gottschlich et al. | |
| 2021/0074039 | A1 | 3/2021 | Kholodkov et al. | |
| 2022/0121741 | A1 | 4/2022 | Araujo et al. | |
| 2024/0333765 | A1 * | 10/2024 | McGrew | H04L 63/145 |
| 2025/0094587 | A1 * | 3/2025 | Nguyen | G06F 21/566 |

FOREIGN PATENT DOCUMENTS

| | | | | | |
|---|---|---|---|---|---|
| CN | 112269316 A | * | 1/2021 | | G05B 13/042 |
| CN | 115412372 A | * | 11/2022 | | H04L 63/145 |
| CN | 119835060 A | * | 4/2025 | | G06F 18/2433 |

OTHER PUBLICATIONS

Machine translation of Gao, CN 115412372 A, 1 page (Year: 2022).*
Machine translation of Yu, CN 112269316 A, 2 pages (Year: 2021).*
Machine translation of Ma, CN 119835060 A, 1 page (Year: 2025).*

* cited by examiner

*Primary Examiner* — Christopher A Revak
(74) *Attorney, Agent, or Firm* — Polsinelli P.C.

(57) ABSTRACT

The present technology provides solutions for performing real-time analytics based on generated telemetry. An example method includes identifying an executable file and one or more actions performed on a host, where the one or more actions are associated with the executable file, generating, by a data processing unit, a behavioral graph having one or more nodes based on the executable file and the one or more actions, and determining, by the data processing unit, that the executable file is a malicious file based on the behavioral graph. Computer-readable media and systems are also provided.

20 Claims, 5 Drawing Sheets

300

IDENTIFY AN EXECUTABLE FILE AND ONE OR MORE ACTIONS PERFORMED ON A HOST, WHEREIN THE ONE OR MORE ACTIONS ARE ASSOCIATED WITH THE EXECUTABLE FILE 302

GENERATE, BY A DATA PROCESSING UNIT, A BEHAVIORAL GRAPH HAVING ONE OR MORE NODES BASED ON THE EXECUTABLE FILE AND THE ONE OR MORE ACTIONS 304

DETERMINE, BY THE DATA PROCESSING UNIT, THAT THE EXECUTABLE FILE IS A MALICIOUS FILE BASED ON THE BEHAVIORAL GRAPH 306

FIG. 3

400

IDENTIFY AN EXECUTABLE FILE AND AN ACTION ASSOCIATED WITH THE EXECUTABLE FILE AND PERFORMED ON A HOST 402

GENERATE A BEHAVIORAL GRAPH HAVING NODES BASED ON THE EXECUTABLE FILE AND THE FIRST ACTION 404

PREDICT A PLURALITY OF POSSIBLE SUBSEQUENT ACTIONS BASED ON THE BEHAVIORAL GRAPH 406

IDENTIFY THAT AT LEAST ONE OF THE PLURALITY OF POSSIBLE SUBSEQUENT ACTIONS IS A MALICIOUS ACTION 408

ADD A POLICY TO A POLICY ENGINE TO PREVENT EXECUTION OF THE AT LEAST ONE OF THE PLURALITY OF POSSIBLE SUBSEQUENT ACTIONS 410

IDENTIFY A SUBSEQUENT ACTION ASSOCIATED WITH THE EXECUTABLE FILE AND PERFORMED ON THE HOST 412

UPDATE THE NODES OF THE BEHAVIORAL GRAPH BASED ON THE SUBSEQUENT ACTION 414

PREDICT A SECOND PLURALITY OF POSSIBLE SUBSEQUENT ACTIONS BASED ON THE UPDATED BEHAVIORAL GRAPH 416

DETERMINE THAT AT LEAST ONE OF THE SECOND PLURALITY OF POSSIBLE SUBSEQUENT ACTIONS IS THE MALICIOUS ACTION OR ANOTHER MALICIOUS ACTION 418

UPDATE THE POLICY TO PREVENT EXECUTION OF THE AT LEAST ONE OF THE SECOND PLURALITY OF POSSIBLE SUBSEQUENT ACTIONS 420

FIG. 4

GENERATING TELEMETRY BASED ON DATA PROCESSING UNITS PERFORMING REAL-TIME ANALYSIS CLOSE TO DATA SOURCE

TECHNICAL FIELD

The subject matter of this disclosure relates in general to the field of computer network security, and more particularly to generating telemetry as behavioral graphs based on data processing units performing real-time analytics close to a data source.

BACKGROUND

In an increasingly digital world, security solutions are becoming more and more important to safely protect sensitive data. As corporations begin utilizing data, such corporations desire to protect their own data and the data of their users. Such data can be useful, valuable, and desired for various different reasons. In some instances, malicious users may seek to obtain and/or access such data.

Malicious actors typically perform cyber attacks to gain access and/or obtain protected data. While security solutions exist to prevent and protect against such cyber attacks, malicious actors continually evolve their methods of attack and create and/or otherwise leverage new vulnerabilities and/or exploits. As such, security professionals also continually update and evolve security solutions. Both the malicious actors and the security professionals are in an unending cycle of evolution and aware of the improvements of each side.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a method for performing real-time analytics based on generated telemetry in accordance with some aspects of the present technology.

FIG. 4 illustrates a method for performing real-time analytics based on generated telemetry in accordance with some aspects of the present technology.

DETAILED DESCRIPTION

Figure 1:
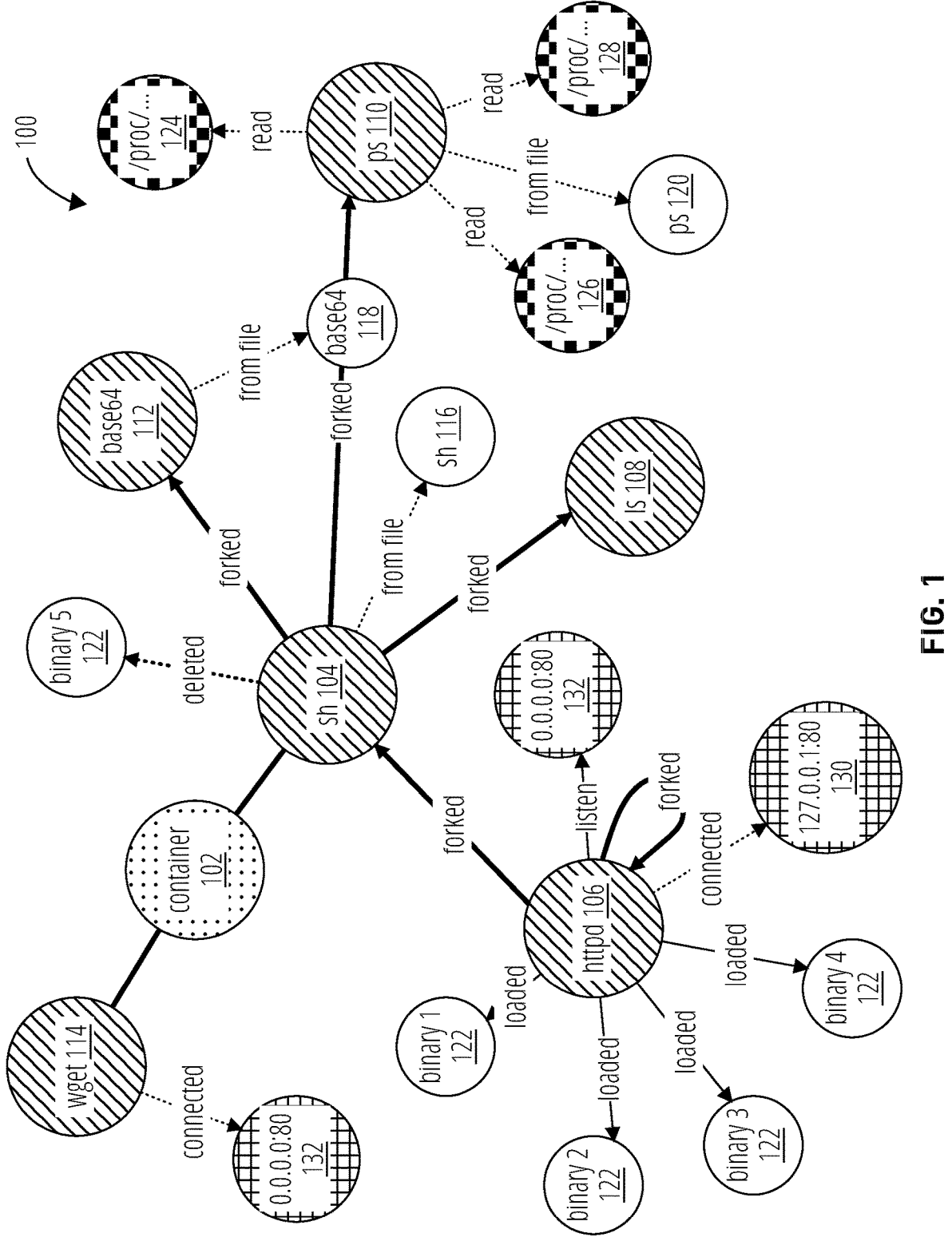
FIG. 1 illustrates an example behavioral graph in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

In one aspect, a method for performing real-time analytics based on generated telemetry, the method includes identifying an executable file and one or more actions performed on a host, where the one or more actions are associated with the executable file, generating, by a data processing unit, a behavioral graph having one or more nodes based on the executable file and the one or more actions, and determining, by the data processing unit, that the executable file is a malicious file based on the behavioral graph.

In another aspect, the method may also include receiving a graph query associated with a malicious behavior, and determining, by the data processing unit, whether the behavioral graph matches the graph query.

In another aspect, determining that the executable file is the malicious file is based on the behavioral graph matching the graph query.

In another aspect, the method may also include receiving a graph query associated with a process, and determining, by the data processing unit, whether the process is present in the behavioral graph.

In another aspect, the method may also include comparing, by the data processing unit, the behavioral graph against a database of known vulnerability behavioral graphs.

In another aspect, determining that the executable file is the malicious file is based on the behavioral graph matching at least one behavioral graph in the database of known vulnerability behavioral graphs.

In another aspect, the method may also include converting the behavioral graph into an adjacency matrix, where determining that the executable file is the malicious file is based on the adjacency matrix.

In one aspect, a non-transitory computer-readable storage medium, the computer-readable storage medium including instructions that when executed by a processor, cause the processor to identify an executable file and one or more actions performed on a host, where the one or more actions are associated with the executable file, generate, by a data processing unit, a behavioral graph having one or more nodes based on the executable file and the one or more actions, and determine, by the data processing unit, that the executable file is a malicious file based on the behavioral graph.

In one aspect, a system includes a processor and a memory storing instructions that, when executed by the processor, cause the processor to identify an executable file and one or more actions performed on a host, where the one or more actions are associated with the executable file, generate, by a data processing unit, a behavioral graph having one or more nodes based on the executable file and the one or more actions, and determine, by the data processing unit, that the executable file is a malicious file based on the behavioral graph.

DESCRIPTION

In an increasingly digital world, security solutions are becoming more and more important to safely protect sensitive data. As corporations begin utilizing data, such corporations desire to protect their own data and the data of their users. Such data can be useful, valuable, and desired for various different reasons. In some instances, malicious users may seek to obtain and/or access such data.

Malicious actors typically perform cyber attacks to gain access and/or obtain protected data. While security solutions exist to prevent and protect against such cyber attacks, malicious actors continually evolve their methods of attack and create and/or otherwise leverage new vulnerabilities and/or exploits. As such, security professionals also continually update and evolve security solutions. Both the malicious actors and the security professionals are in an unending cycle of evolution and aware of the improvements of each side.

For example, security professionals are aware of the malicious objectives and common actions or "known bad" list of behaviors that malicious actors frequently utilize to achieve their objectives (e.g., as documented by the MITRE ATT&CK framework). On the other hand, the malicious actors are aware of the "known bad" list of behaviors and that security professionals are watching for these behaviors. Consequently, malicious actors try to obfuscate their actions by using circuitous routes to achieve their objectives rather than straightforward routes. These methods become increasingly complex and have misdirections to avoid detection.

Behavioral graphs may be used to detect malicious behaviors. However, these behavioral graphs have historically been used after an attack has occurred, rendering the usage of such behavioral graphs ineffective for prevention and protection. Furthermore, behavioral graphs have traditionally required a host to report individual actions as observed with the help of extended Berkeley Packet Filter (eBPF) or other techniques that provide the interception on the host being observed. These individual actions would be observed and selected among hundreds of thousands or more of other processes, actions, files, and other context.

It is desirable to detect cyber attacks while the attacks are still in progress and before the system or data has been compromised. For example, it is desirable to detect cyber attacks in real-time, rather than determining an attack has occurred after the system or data has been compromised.

The disclosed technology addresses the need in the art for performing real-time analytics based on generated telemetry. For example, the present disclosure provides the usage of data processing units (DPUs) to generate behavioral graphs. New and upcoming DPUs provide large amounts of compute and general acceleration, both of which improve computational capacity and throughput.

The DPUs can be inserted into a host or located on a same subnet as the host to provide endpoint telemetry processing. By virtue of the significant computational capacity and by being inserted in or on the same subnet as the host, the DPUs can generate endpoint telemetry in real-time. The DPUs can also analytically process the telemetry in real-time directly at the DPU. For example, the DPU can process the information for network and security functions including, but not limited to, faster packet processing, encryption/decryption, filtering, pattern matching, etc. By processing telemetry at the DPU, the analysis can include more contextual information expressed in different models as opposed to sending large volumes of data, which provide less probative value and consumes resources and bandwidth.

The DPUs are configured to merge high volumes of reported information into individual behavioral graphs per process and/or group of processes. These behavioral graphs can be used by the DPU to perform advanced security detections in real-time. Additionally, the behavioral graphs can be sent to collecting servers (e.g., in a cloud network) to be merged with other individual behavioral graphs into a single graph for an entirety of the host. By expressing processes and contextual information as behavioral graphs, security professionals will be able to more readily identify malicious actions that fall within the list of well-known malicious behaviors.

For example, a behavioral graph for a particular process can include contextual information by representing processes, file paths, connections, binaries, and more as nodes, while including relationships as edges connecting respective nodes. The behavioral graphs track, identify, and maintain relationships between a process and subsequent actions, associated binaries, associated locations, associated processes (e.g., child processes), associated connections, etc. Consequently, the various actions, binaries, locations, processes, connections, and other context can be traced to the process. For example, a particular process may be identified as a malicious process by analyzing relationships between the malicious process and known malicious actions, such as opening an outgoing connection from a restricted process.

It is further contemplated that the behavioral graphs be expressed as adjacency matrixes. For example, graphics processing units (GPUs), field programmable gate arrays (FPGAs), central processing units (CPUs), and DPUs are optimized to perform matrix operations at high speeds. By expressing the behavioral graphs as adjacency matrixes, GPUs, FPGAs, CPUs, and DPUs will be able to utilize the dense amount of data in the behavioral graphs in real-time.

Additionally, it is further contemplated that the matrixes be sparse compressed matrix, which can easily be expanded to non-compressed matrixes and still be space-efficient sparse matrixes. These sparse matrixes can also improve efficiency for performing behavioral matching expressed at high speed as matrix operations and/or merging of individual behavioral matrixes into a large host behavioral graph matrix. Similarly, security policies of both simple or complex operations/rules can be expressed as matrixes and search/match operations can also be performed at high speed.

The behavioral graphs can also be used to generate predictions of next actions and prevent cyber attacks. As users perform actions (e.g., writing a script, running a script, etc.), the DPU can add corresponding edges and nodes to the behavioral graph(s). As the chain on the behavioral graph(s) grow, the DPU can generate stronger predictions for possible next actions that the user may perform. For example, the DPU can predict the next edges of the behavioral graph and determine whether any of the edges include important targets of well-known malicious behaviors. The DPU can, based on determining that at least one edge includes at least one target of at least one well-known malicious behavior, cache and provide the information to eBPF for consultation and protection at run time.

For example, attackers may attempt to avoid detection of their malicious activities by obfuscating their attempts with various indirect actions and misdirections. However, the attackers will still have the same ultimate objective. For example, attackers may be attempting to access a shadow file. As the attackers write scripts, run scripts, perform particular actions, change modes, and other actions, the DPU can maintain these actions in a behavioral graph. As the behavioral graph grows, the DPU can continuously predict sets of next edges and/or nodes after each action. Since some actions may, at first, appear benign, the DPU can identify a probability for possible next actions and refine predictions of subsequent actions after each action. For example, the DPU may identify several possible actions when the attacker uses an executable to start a process that writes a script. As the process is started, the DPU may predict another set of possible actions based on the context of the executable starting the process. Similarly, as the script is written and executed, the DPU may predict yet another set of possible actions based on the context of the executable starting the process and the process writing the script.

In some instances, the predicted set of actions may include an increasing number of malicious or otherwise undesired behaviors. The DPU can communicate the predicted set of actions and the contextual information to a security enforcer (e.g., eBPF) to restrict or otherwise prevent the malicious or undesired behaviors from being performed. For example, the script above may be configured to register a service that deletes the process that started the chain of activities and subsequently perform an undesired action, such attempting to access a shadow file. As the script runs, the DPU may predict that the script may register the service. Similarly, as the service begins to delete the process, the DPU may predict that the service may attempt to access the shadow file. The DPU can, in response to predicting the possibility of performance of an undesired action, communicate the prediction and contextual information to the eBPF, so that the eBPF can prevent the undesired action from occurring. In some instances, the eBPF can be configured to also kill the service performing the undesired action.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Turning now to the figures, FIG. 1 illustrates an example behavioral graph 100 (e.g., as generated by a DPU associated with a host (e.g., by being inserted into the host and/or connected to the same subnet as the host).

The behavioral graph 100 includes various nodes identifying container 102, processes 104-114, binaries 116-122, file paths 124-128, and network endpoints 130-132 connected by various edges identifying relationships therebetween. Container 102 is a container on the host and can include some or all of the processes 104-114, binaries 116-122, file paths 124-128, and network endpoints 130-132.

The processes 104-114 can include various different processes running and/or stored on container 102. For example, process 104 is a Bourne Shell (sh) configured to take input from a keyboard or a file. Process 106 is a Hypertext Transfer Protocol (HTTP) daemon (httpd) configured as a server using HTTP and/or HTTPS network protocols to receive and answer requests. Processes 108, 110 are ls and ps, which respectively displays all files in the current directory and lists all running processes. Process 112 is base64, a process configured to decode and/or encode between binary data and text. Process 114 is wget, a process for retrieving files and other content using HTTP, HTTPS, FTP, and/or FTPS from a server (e.g., via network endpoint 132).

Processes 104-114 can perform various actions and interact with other processes 104-114, binaries 116-122, file paths 124-128, and network endpoints 130-132. For example, a user can utilize process 104 (sh) to decode a file using process 112 (base64). Similarly, a user can utilize process 104 (sh) to delete a binary 122 (e.g., binary 5) and/or load other binaries 122 (e.g., binaries 1-4). A user can also utilize process 110 to read file paths 124-128. As yet another example, a user can utilize process 114 (wget) to retrieve files from a server (e.g., via network endpoint 132).

Binaries 116-122 include particular set(s) of executables or compiled program files that will perform particular functions. Binaries 116-122 can be used by processes 104-114 to perform required functions. For example, process 112 (base64) can utilize the binary 118 (base64) to decode a file.

File paths 124-128 identify the location of corresponding files. File paths 124-128 provide additional contextual information for associated processes and/or binaries.

Network endpoints 130-132 are communication endpoints that allow data to flow in and out of container 102. Processes 104-114 may, in some instances, communicate across network endpoints 130-132 to retrieve and/or send data. For example, process 114 (wget) is connected to network endpoint 132 (0.0.0.0:80). As another example, process 106 (httpd) is connected to network endpoint 130 (127.0.0.1) and listens to network endpoint 132 (0.0.0.0:80).

While FIG. 1 illustrates processes, binaries, file paths, and network endpoints as nodes, one of ordinary skill in the art would understand that other data can be included as nodes. For example, containers, command lines, user accounts, pipes, and other actions and/or tags can be included as nodes on behavioral graph 100. Similarly, various forms of relationships can be illustrated as edges between nodes. For example, the relationships between nodes can be a node reading another node, containing another node, having another node, using another node as a user, modifying another node, deleting another node, creating another node, loading another node, forking into another node, connected to another node, listening to another node, opening another node, etc.

Figure 2:
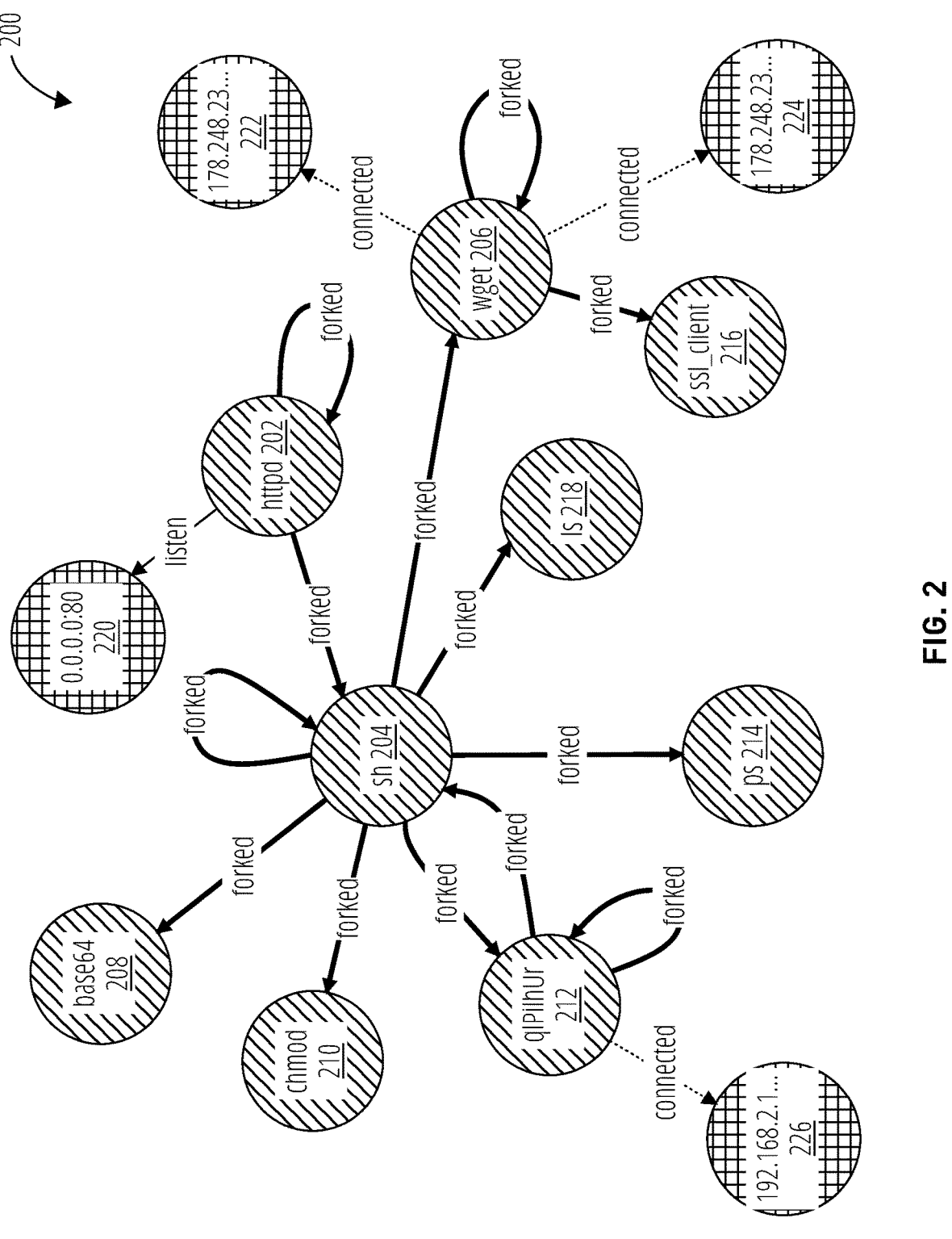
FIG. 2 illustrates an example behavioral graph in accordance with some aspects of the present technology.

FIG. 2 illustrates an example behavioral graph 200. FIG. 2 illustrates a simplified behavioral graph 200 for discussion and clarity purposes, but one of ordinary skill in the art would recognize that many other forms of context can be added to behavioral graph 200 including, but not limited to, binaries (e.g., binaries 116-122 as discussed above with respect to FIG. 1), file paths (e.g., file paths 124-128 as discussed above with respect to FIG. 1), among others. Behavioral graph 200 illustrates an example attack from a malicious user.

A malicious user may connect to httpd 202 through network endpoint 220 (e.g., network endpoint 0.0.0.0:80). Using an exploit, the malicious user caused httpd 202 to start a shell (e.g., sh 204). Sh 204 creates a file 212 with a random name (e.g., qlPihUr text file) in a temporary directory. Sh 204 then runs base64 208 to decode the file 212 from base64 to produce a binary (e.g., qlPihUr binary). The attacker then uses sh 204 to run change mode (e.g., chmod 210) and change bits of the file 212 into an executable (e.g., qlPihUr executable). Sh 204 then runs the executable file 212, which can generate a normal shell (e.g., a native instance of sh 204) as though the attacker was using the terminal. File 212 is then connected to command and can control network endpoint 226 and can start receiving shell commands for sh 204 from network endpoint 226. With the new sh 204, the attacker has expanded controls over the system. For example, the attacker can then use the new sh 204 to run wget 206 to retrieve files from network endpoints 222, 224 (e.g., using ssl_client 216). Using the new sh 204, the attacker can also run ps 214 and ls 218 to determine running processes and where they are. The malicious user can then continue to perform other malicious and/or undesirable actions.

Each of the above steps are captured and portrayed by behavioral graph 200. Behavioral graph 200 can then be used to determine whether a process and/or file is a malicious process and/or file.

For example, behavioral graph 200 can be matched against a database or collection of behavioral graphs associated with known malicious behaviors (e.g., as documented by the MITRE ATT&CK framework. As discussed above, the behavioral graph 200 can be represented as an adjacency matrix for quick calculations and comparisons.

In some embodiments, behavioral graph 200 can be used to query particular processes and/or files. For example, a container associated with behavioral graph 200 may typically not be permitted to have outgoing connections. However, a security researcher may identify an outgoing connection (e.g., through network endpoint 226) from file 212 (e.g., the malware file). In some instances, there may be a legitimate reason for the outgoing connection such as an administration utilizing the connection. The security researcher may then need to determine whether this is a legitimate connection.

Httpd 202 is not permitted to generate outgoing connections and would be acting abnormally by generating an outgoing connection. The security researcher can utilize the behavioral graph 200 to query whether there is a connection or relationship between httpd 202 and the outgoing connection through network endpoint 226. For example, the security researcher can query or otherwise determine (e.g., using a DPU) whether there is a path in the behavioral graph 200 between httpd 202 and network endpoint 226. A path between httpd 202 and the outgoing connection through network endpoint 226 indicates what files performed which actions to result in the creation of the outgoing connection through network endpoint 226. Consequently, if a path exists between httpd 202 and the outgoing connection through network endpoint 226, then the security professional can determine that httpd 202 is capable of performing an undesirable action and that there is likely some malicious behavior on the system based on the sequence of events demonstrated in the behavioral graph 200. Furthermore, the behavioral graph 200 facilitates tracking malicious actions even across intentional misdirections and other obfuscating actions from malicious actors due to all of the actions being a part of the path between nodes (e.g., httpd 202 and network endpoint 226).

After determining and/or identifying the malicious behavior, the malicious behavior can be stopped by killing the process and all created or otherwise related children processes.

As discussed above, the behavioral graph 200 provides contextual information for processes and files. The contextual information can be used to predict subsequent actions. Based on the predicted subsequent actions, the DPU can be configured to communicate malicious actions to a security enforcer (e.g., eBPF) to prevent the malicious action from being performed.

For example, when the malicious user connected to httpd 202 through network endpoint 220 and created sh 204, the DPU may predict a first set of possible subsequent actions and/or predict a set of possible next nodes. For example, the DPU may predict that the process may generate a file, check statuses of running processes, change directories, etc. The DPU can utilize various methods for predicting the set of possible subsequent actions can be predicted. For example, the DPU can perform conditional probability calculations and/or estimations.

If a undesired action and/or node is among the set of possible subsequent actions and/or set of possible next nodes, the DPU can communicate with the security enforcer to inform the security enforcer of the possibility and to request that the security enforcer restrict performance of the undesired action. Consequently, legitimate actions and users would not be impacted, while also preventing performance of undesired actions.

The DPU can also continue generating predictions after each subsequent action. For example, after the malicious user generated file 212 using sh 204, the DPU can predict that the user may run base64 to decode the file 212, move the file 212, delete the file 212, etc. The DPU can perform conditional probability calculations and/or estimations based on previous actions and relationships including the connection to httpd 202 through network endpoint 220, the creation of sh 204, and the generation of file 212.

Again, if an undesired action and/or node is among the new set of possible subsequent actions and/or set of possible next nodes, the DPU can communicate with the security enforcer to prevent the undesired action from being performed. Again, legitimate actions and users would not be affected, while the system is protected from undesired actions.

In some instances, the DPU may increasingly predict, based on the growing chain of actions and processes, a higher likelihood of malicious actions. In some embodiments, the system may be configured to kill processes and created child and/or otherwise associated processes when a probability of a process and/or file being a malicious process and/or file exceeds a threshold.

FIG. 3 illustrates an example method 300 for performing real-time analytics based on generated telemetry. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At block 302, the method 300 can include identifying an executable file and one or more actions performed on a host associated with the system, wherein the one or more actions are associated with the executable file.

At block 304, the method 300 can include generating, by a data processing unit, a behavioral graph having one or more nodes based on the executable file and the one or more actions.

In some embodiments, the method 300 can include converting, by the data processing unit, the behavioral graph into an adjacency matrix and/or a behavioral matrix, wherein determining that the executable file is the malicious file is based on the adjacency matrix and/or the behavioral matrix.

At block 306, the method 300 can include determining, by the data processing unit, that the executable file is a malicious file based on the behavioral graph.

In some embodiments, the method 300 can include receiving a graph query associated with a malicious behavior and/or a process.

In some embodiments, the method 300 can include determining, by the data processing unit, whether the behavioral graph matches the graph query. In some embodiments, determining that the executable file is the malicious file is based on the behavioral graph matching the graph query.

In some embodiments, the method 300 can include determining, by the data processing unit, whether the process is present in the behavioral graph. In some embodiments, determining that the executable file is the malicious file is based on the process being present in the behavioral graph. In some embodiments, the process is identified as an abnormal process.

In some embodiments, the method 300 includes comparing, by the data processing unit, the behavioral graph against a database of known vulnerability behavioral graphs. In some embodiments, determining that the executable file is the malicious file is based on the behavioral graph matching at least one behavioral graph in the database of known vulnerability behavioral graphs.

FIG. 4 illustrates an example method 400 for performing real-time analytics based on generated telemetry. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At block 402, the method 400 can include identifying an executable file and an action associated with the executable file and performed on a host.

At block 404, the method 400 can include generating a behavioral graph having nodes based on the executable file and the action.

At block 406, the method 400 can include predicting a plurality of possible subsequent actions based on the behavioral graph. In some embodiments, predicting the plurality of possible subsequent actions includes determining probabilities of possible subsequent actions based on the behavioral graph and a predictive model, and selecting a predetermined number of most probable possible subsequent actions. In some embodiments, the predictive model is a statistical or machine learning model trained to predict a probability distribution of subsequent actions based on a behavioral graph input. In some embodiments, the predictive model is trained on a dataset of behavioral graphs of benign software and/or malware.

At block 408, the method 400 can include identifying that at least one of the plurality of possible subsequent actions is a malicious action. In some embodiments, the at least one of the plurality of possible subsequent actions is accessing a predetermined file. In some embodiments, the malicious action is accessing the predetermined file. In some embodiments, the at least one of the plurality of possible subsequent actions violates a security policy.

At block 410, the method 400 can include adding a policy to a policy engine to prevent execution of the at least one of the plurality of possible subsequent actions.

At block 412, the method 400 can include identifying a subsequent action associated with the executable file and performed on the host.

At block 414, the method 400 can include updating nodes of the behavioral graph based on the subsequent action.

At block 416, the method 400 can include predicting a subsequent plurality of possible subsequent actions based on the updated behavioral graph. In some embodiments, a probability that the subsequent plurality of possible subsequent actions includes the malicious action or another malicious action is higher than a probability that the plurality of possible subsequent actions includes the malicious action. In some embodiments, the system predicts a higher probability of the malicious action or another action in the second plurality of possible subsequent actions.

At block 418, the method 400 can include determining that at least one of the subsequent plurality of possible subsequent actions is the malicious action or another malicious action.

At block 420, the method 400 can include updating the policy to prevent execution of the at least one of the subsequent plurality of possible subsequent actions.

In some embodiments, the method 400 can include determining, by the policy engine, an attempt associated with the executable file to perform the at least one of the plurality of possible subsequent actions.

In some embodiments, the method 400 can include determining, based on determining the attempt, that the executable file is a malicious file.

In some embodiments, the method 400 can include preventing, by the policy engine, the execution of the at least one of the plurality of possible subsequent actions based on determining the attempt.

Figure 5:
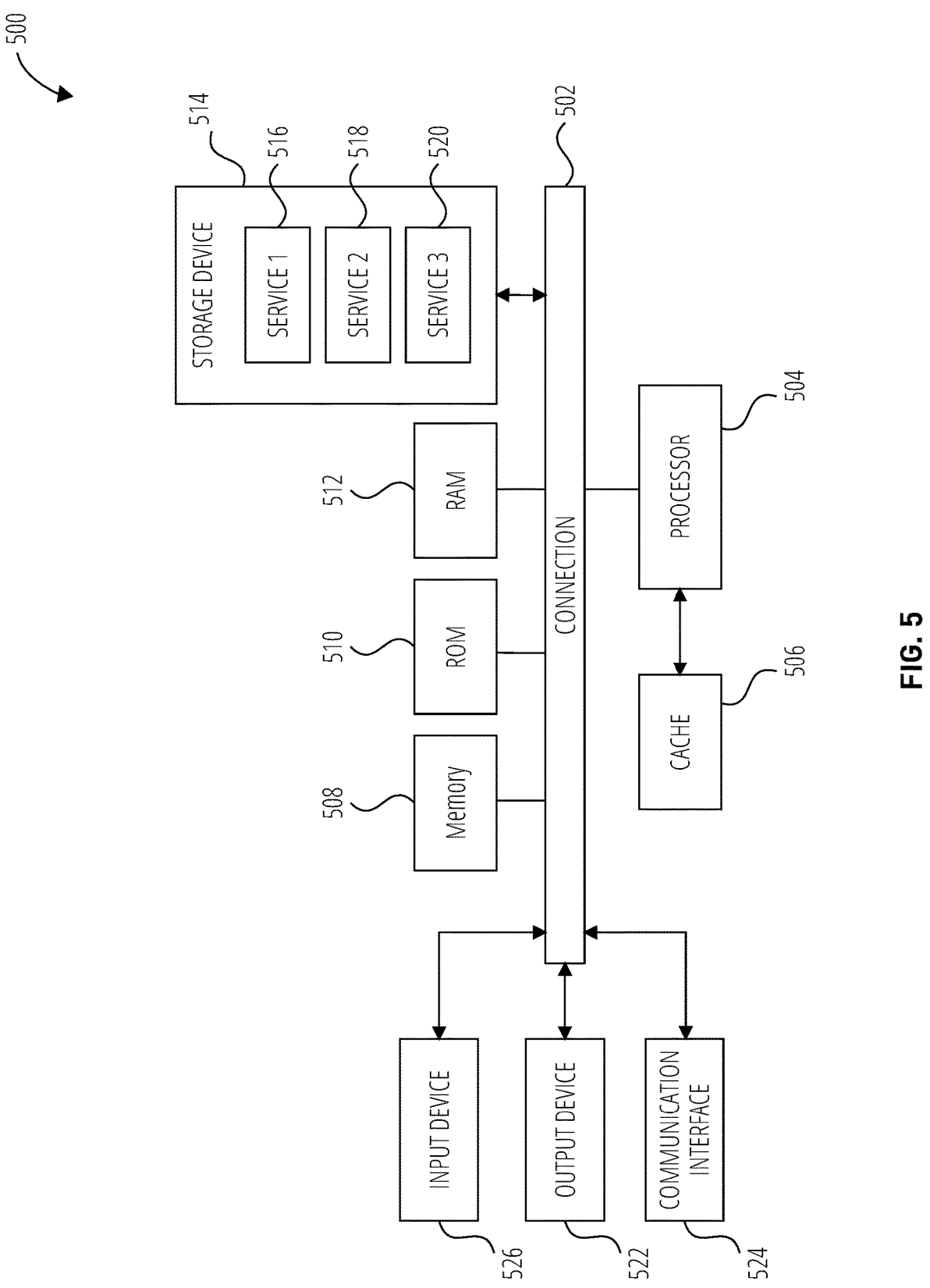
FIG. 5 shows an example of a system for implementing certain aspects of the present technology.

FIG. 5 shows an example of computing system 500, which can be for example any computing device making up a DPU, host, server, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for performing real-time analytics based on generated telemetry, the method comprising:
   identifying an executable file and one or more actions performed on a host, wherein the one or more actions are associated with the executable file;
   generating, by a data processing unit, a behavioral graph based on the executable file and the one or more actions;
   receiving a graph query associated with a malicious behavior; and
   determining, by the data processing unit, that the executable file is a malicious file based on a match between the graph query and the behavioral graph.

2. The method of claim 1, further comprising:
   receiving a graph query associated with a process; and
   determining, by the data processing unit, whether the process is present in the behavioral graph.

3. The method of claim 1, further comprising:
   comparing, by the data processing unit, the behavioral graph against a database of known vulnerability behavioral graphs.

4. The method of claim 3, wherein determining that the executable file is the malicious file is based on the behavioral graph matching at least one behavioral graph in the database of known vulnerability behavioral graphs.

5. The method of claim 1, further comprising:

converting the behavioral graph into an adjacency matrix, wherein determining that the executable file is the malicious file is based on the adjacency matrix.

6. The method of claim 1, further comprising:

predicting a plurality of possible subsequent actions based on the behavioral graph; and determining, by the data processing unit, that the executable file is a malicious file based on a match between the graph query and at least one of the plurality of possible subsequent actions being malicious.

7. The method of claim 1, further comprising:

adding a policy to prevent execution of the at least one of the plurality of possible subsequent actions.

8. A non-transitory computer-readable storage medium, the computer-readable storage medium including instructions that when executed by a processor, cause the processor to:

identify an executable file and one or more actions performed on a host, wherein the one or more actions are associated with the executable file;

generate, by a data processing unit, a behavioral graph having one or more nodes based on the executable file and the one or more actions;

receiving a graph query associated with a malicious behavior; and determine, by the data processing unit, that the executable file is a malicious file based on a match between the graph query and the behavioral graph.

9. The non-transitory computer-readable storage medium of claim 8, wherein the instructions further cause the processor to:

receive a graph query associated with a process; and determine, by the data processing unit, whether the process is present in the behavioral graph.

10. The non-transitory computer-readable storage medium of claim 8, wherein the instructions further cause the processor to:

compare, by the data processing unit, the behavioral graph against a database of known vulnerability behavioral graphs.

11. The non-transitory computer-readable storage medium of claim 10, wherein determining that the executable file is the malicious file is based on the behavioral graph matching at least one behavioral graph in the database of known vulnerability behavioral graphs.

12. The non-transitory computer-readable storage medium of claim 8, wherein the instructions further cause the processor to:

convert the behavioral graph into an adjacency matrix, wherein determining that the executable file is the malicious file is based on the adjacency matrix.

13. The non-transitory computer-readable storage medium of claim 8, wherein the instructions further cause the processor to:

predict a plurality of possible subsequent actions based on the behavioral graph; and determine that the executable file is a malicious file based on a match between the graph query and at least one of the plurality of possible subsequent actions being malicious.

14. The non-transitory computer-readable storage medium of claim 8, wherein the instructions further cause the processor to:

add a policy to prevent execution of the at least one of the plurality of possible subsequent actions.

15. A system comprising:

a processor; and a memory storing instructions that, when executed by the processor, cause the processor to:

identify an executable file and one or more actions performed on a host, wherein the one or more actions are associated with the executable file;

generate, by a data processing unit, a behavioral graph based on the executable file and the one or more actions;

receiving a graph query associated with a malicious behavior; and determine, by the data processing unit, that the executable file is a malicious file based on a match between the graph query and the behavioral graph.

16. The system of claim 15, wherein the instructions further cause the processor to:

comparing, by the data processing unit, the behavioral graph against a database of known vulnerability behavioral graphs.

17. The system of claim 16, wherein determining that the executable file is the malicious file is based on the behavioral graph matching at least one behavioral graph in the database of known vulnerability behavioral graphs.

18. The system of claim 15, wherein the instructions further cause the processor to:

convert the behavioral graph into an adjacency matrix, wherein determining that the executable file is the malicious file is based on the adjacency matrix.

19. The system of claim 15, wherein the instructions further cause the processor to:

receive a graph query associated with a process; and determine, by the data processing unit, whether the process is present in the behavioral graph.

20. The system of claim 15, wherein the instructions further cause the processor to:

predict a plurality of possible subsequent actions based on the behavioral graph; and determine that the executable file is a malicious file based on a match between the graph query and at least one of the plurality of possible subsequent actions being malicious.

* * * * *